(12) United States Patent
Mondragon-Parra et al.

(10) Patent No.: US 8,353,777 B2
(45) Date of Patent: Jan. 15, 2013

(54) CONSTANT VELOCITY JOINT HAVING OVER-ARTICULATION PROTECTION

(75) Inventors: Eduardo R. Mondragon-Parra, Saginaw, MI (US); Kenta Nakajima, Tokyo (JP)

(73) Assignee: Steering Solutions IP Holding Corporation, Saginaw, MI (US)

( * ) Notice: Subject to any disclaimer, the term of this patent is extended or adjusted under 35 U.S.C. 154(b) by 220 days.

(21) Appl. No.: 12/708,636

(22) Filed: Feb. 19, 2010

(65) Prior Publication Data

US 2010/0216556 A1  Aug. 26, 2010

Related U.S. Application Data

(60) Provisional application No. 61/154,222, filed on Feb. 20, 2009.

(51) Int. Cl.
*F16D 3/205* (2006.01)

(52) U.S. Cl. ........................................ 464/111; 464/905

(58) Field of Classification Search .................. 464/111, 464/123, 124, 905
See application file for complete search history.

(56) References Cited

U.S. PATENT DOCUMENTS 6,699,134 B2   3/2004   Sams et al.
RE39,715 E     7/2007   Perrow

*Primary Examiner* — Gregory Binda
(74) *Attorney, Agent, or Firm* — Cantor Colburn LLP

(57) ABSTRACT

A tripot universal joint includes a first rotatable shaft member having a longitudinal axis and three longitudinal guide channels, each having two opposing concave side surfaces and a back surface. The joint also includes a rotatable second shaft member having a longitudinal axis and comprising a spider having three radially extending trunnions equally, each of the trunnions having a convex outer surface disposed within an associated longitudinal guide channel. The joint further includes three rotatable ball assemblies, each disposed on a convex outer surface of a trunnion, each ball assembly having an outer ball with a convex outer surface that is disposed within the concave side surfaces of the longitudinal guide channel with which it is associated for moveable engagement within the channel and an inner ball with an inner surface that is rotatably disposed on the convex surface of the trunnion with a detachably reattachable coupling.

20 Claims, 7 Drawing Sheets

CONSTANT VELOCITY JOINT HAVING OVER-ARTICULATION PROTECTION

CROSS-REFERENCES TO RELATED APPLICATIONS

This patent application claims priority to U.S. Provisional Patent Application Ser. No. 61/154,222 filed Feb. 20, 2009 which is incorporated herein by reference in its entirety.

FIELD OF THE INVENTION

The subject invention generally relates to a telescoping constant velocity joint, and more particularly, to a telescoping constant velocity joint having over-articulation protection.

BACKGROUND

There are many different types of universal joints. One type of universal joint includes a telescoping constant velocity joint, sometimes referred to as a tripot universal joint. Telescoping constant velocity joints are typically employed in automotive axial drive shafts, and especially in front-wheel-drive vehicles between the transaxle differential and the driving wheel. The telescoping constant velocity joint transmits a torque at various speeds, angles and telescopic positions between shaft members.

As shown in FIGS. 7 and 8, related art telescoping constant velocity joints 20' may include a first shaft member 22' and a second shaft member 24'. The first shaft member includes a housing 28'. The housing defines a plurality, but preferably three, internal guide channels. The guide channels extend along and parallel to a longitudinal axis of the first shaft member 22'. The second shaft member 24' includes a spider 40' disposed at one end of the second shaft member 24'. The spider 40' is disposed within the housing 28' of the first shaft member 22'. The spider 40' includes a plurality, but preferably three, trunnions 42'. The telescoping constant velocity joint includes a plurality of ball assemblies 52'. One of the ball assemblies 52' is rotatably mounted to each of the trunnions 42', and is disposed in one of the guide channels in rolling engagement with the guide channel. The ball assemblies may include inner balls 54', and outer balls 56', and a plurality of roller elements 58' disposed between the inner balls 54' and the outer balls 56'. The roller elements 58', in combination with the inner balls and the outer balls, effectively create a needle bearing assemblies. Accordingly, the roller elements 58' reduce rolling friction between the inner balls 54' and the outer balls 56'.

These telescoping constant velocity joints 20' function well, but are restricted to operating within a predetermined angular range of articulation, illustrated as angular range 50' in FIG. 7, where the joint maintains a predetermined or nominal joint condition where the inner ball 54' is rotatable about the centroid 70' of the trunnion 42' with the inlet diameter 72' disposed axially inwardly of the centroid 70' with reference to the spider center 44', i.e., closer to the spider center 44', as shown in FIG. 8. If the first shaft member 22' and the second shaft member 24' are articulated beyond this range of articulation in an angular range of over-articulation, illustrated as angular range 51' in FIG. 7, then at least one of the ball assemblies 52' may separate from the trunnion 42', as shown in FIG. 7. Once the ball assembly 52' is separated from the trunnion 42', the ball assembly 52' will not reattach itself to the trunnion 42' when the joint is returned within the predetermined angular range of articulation 50' (FIG. 9) and thus the detachment is irreversible and the joint is incapable of returning to the nominal condition (FIG. 8) where the trunnion 42' and convex outer surface 48' are disposed inside the inlet diameter 72' and along inner surface 62' of inner ball 54' as it rotates. Rather, the centroid 70' of the trunnion 42' will be disposed outside the inlet diameter 72' and inner surface 62' of inner ball 54' will rotate on only a small bearing surface on the upper portion of trunnion 42' as shown in FIG. 9. Once the universal joint 20' has experienced an over-articulated condition, the joint must be disassembled to re-attach the detached ball assembly 52', particularly the inner surface 62' of the detached inner ball 54' onto the convex outer surface 48' of trunnion 42', i.e., the spider 40' must be removed from within the housing 28' to re-attach the ball assembly 52' onto the trunnion 42', which may also necessitate removing the universal joint from its application, such as the drivetrain of a vehicle.

Therefore, it is desirable to develop universal joints that are protected from such irreversible detachment of the ball assembly in response to over-articulation of the joint, particularly detachment that requires disassembly of the joint to return the detached ball assembly and joint to a nominal condition.

SUMMARY OF THE INVENTION

In an exemplary embodiment of the present invention, a tripot universal joint is provided. The joint includes a first rotatable shaft member having a first longitudinal axis and a housing, the housing having three longitudinal guide channels disposed parallel to the first longitudinal axis and equally spaced circumferentially from one another, each one of the three longitudinal guide channels defined by two opposing concave side surfaces and a back surface, the back surface of each guide channel facing radially inwardly with respect to the first longitudinal axis, the opposing concave side surfaces of each guide channel disposed parallel to one another and separated circumferentially with respect to the outer drive member by the back surface of that guide channel. The joint also includes a rotatable second shaft member having a second longitudinal axis and comprising a spider having three radially extending trunnions equally spaced circumferentially from one another and on respective coplanar radial axes which intersect the second longitudinal axis at a spider center, each of the trunnions having a convex outer surface disposed within an associated longitudinal guide channel and facing the opposing concave side surfaces thereof. The joint further includes three rotatable ball assemblies, each rotatably disposed on the convex outer surface of a respective trunnion and configured to tilt and rotate about the trunnion and to slide along the radial axis of the trunnion, each ball assembly having an outer ball, the outer ball having a convex outer surface that is configured for disposition within the concave side surfaces of the longitudinal guide channel with which it is associated for moveable engagement within the channel, and an inner ball that is rotatably disposed within the outer ball with a concave inner surface that is rotatably disposed on the convex surface of the trunnion with a detachably reattachable coupling.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
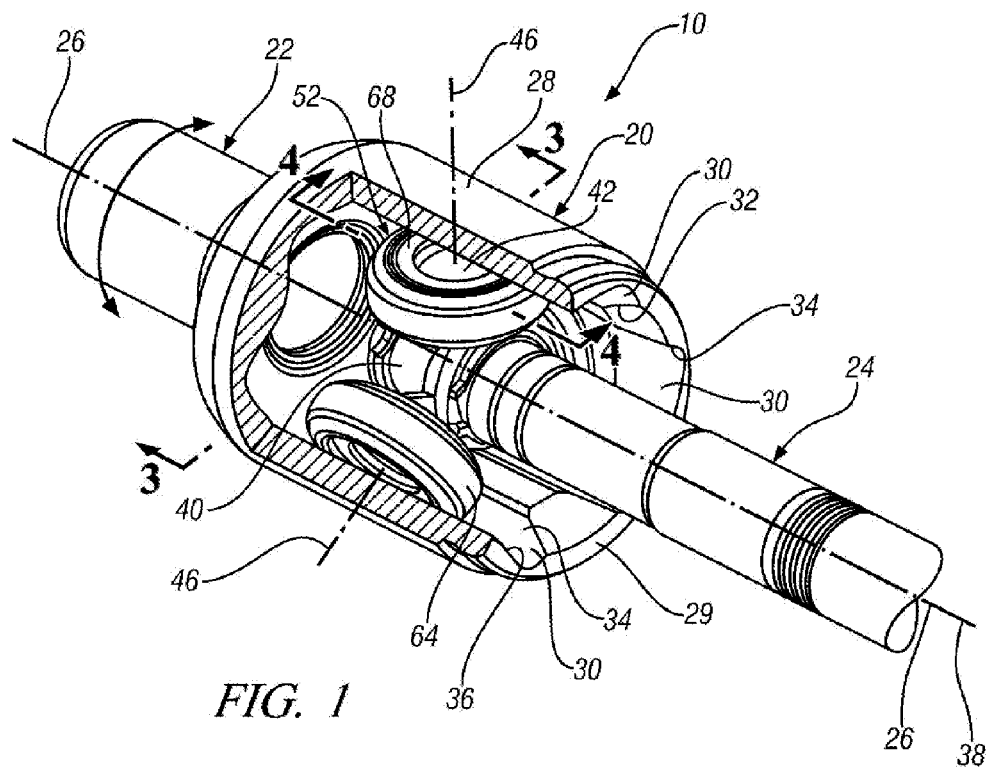
FIG. 1 is a perspective view of an exemplary embodiment of a telescoping constant velocity joint as disclosed herein in an un-articulated position.

The following description is merely exemplary in nature and is not intended to limit the present disclosure, application or uses. It should be understood that throughout the drawings, corresponding reference numerals indicate like or corresponding parts and features.

Referring to the FIGS. 1-4, a universal joint is shown generally at 10. The universal joint 10 is a telescoping constant velocity joint 20, often referred to as a tripot joint. The constant velocity (CV) joint 20 transmits a torque between a first rotatable shaft member 22 and a second rotatable shaft member 24 at various rotational speeds, joint angles and telescopic positions. The constant velocity joint 20 is suitable for use in numerous vehicular applications, including trucks, automobiles, various recreational vehicles and the like, and is particularly useful for use in front wheel drive vehicles between the transaxle differential and the driving wheel. However, it should be appreciated that the constant velocity joint 20 may be utilized in other applications in which a torque must be transferred between two rotatable shaft members 22, 24 that must be configured to enable movement of axial and angular positions relative to one another. Universal joint 10 is particularly suitable for use in CV joint 20 applications, including various vehicular applications of the types described above.

The first rotatable shaft member 22 extends along and is rotatable about a first longitudinal axis 26. The first rotatable shaft member 22 includes a housing 28 at a joint end 29. The housing 28 defines a plurality of axially extending guide channels or channels 30 extending along and parallel with the first longitudinal axis 26 of the first rotatable shaft member 22. In an exemplary embodiment, as illustrated in FIGS. 1-4, housing 28 defines three guide channels 30. The guide channels 30 are circumferentially and radially spaced equally about the first longitudinal axis 26. As shown, the three guide channels 30 are circumferentially and radially spaced about the first longitudinal axis 26 at 120 degree intervals from each other. However, it should be appreciated that the number of guide channels 30 within the housing 28 may vary from the three guide channels 30 shown.

Each guide channel 30 includes a first side surface 32 and an opposing second side surface 34. The first side surface 32 and the second side surface 34 are separated circumferentially about the first longitudinal axis 26 by a back surface 36. The back surface 36 faces radially inward toward the first longitudinal axis 26. The first side surface 32 and the second side surface 34 each include a concave shape opposing the other of the first side surface 32 and the second side surface 34. The opposing concave side surfaces 32, 34 of each guide channel 30 are disposed parallel to one another and are separated circumferentially with respect to the first rotatable shaft member 22 by the back surface 36 of that guide channel 30. In an exemplary embodiment, the opposing concave surfaces may comprise surfaces defined by opposing elliptical arcs that extend axially along guide channels 30.

Figure 2:
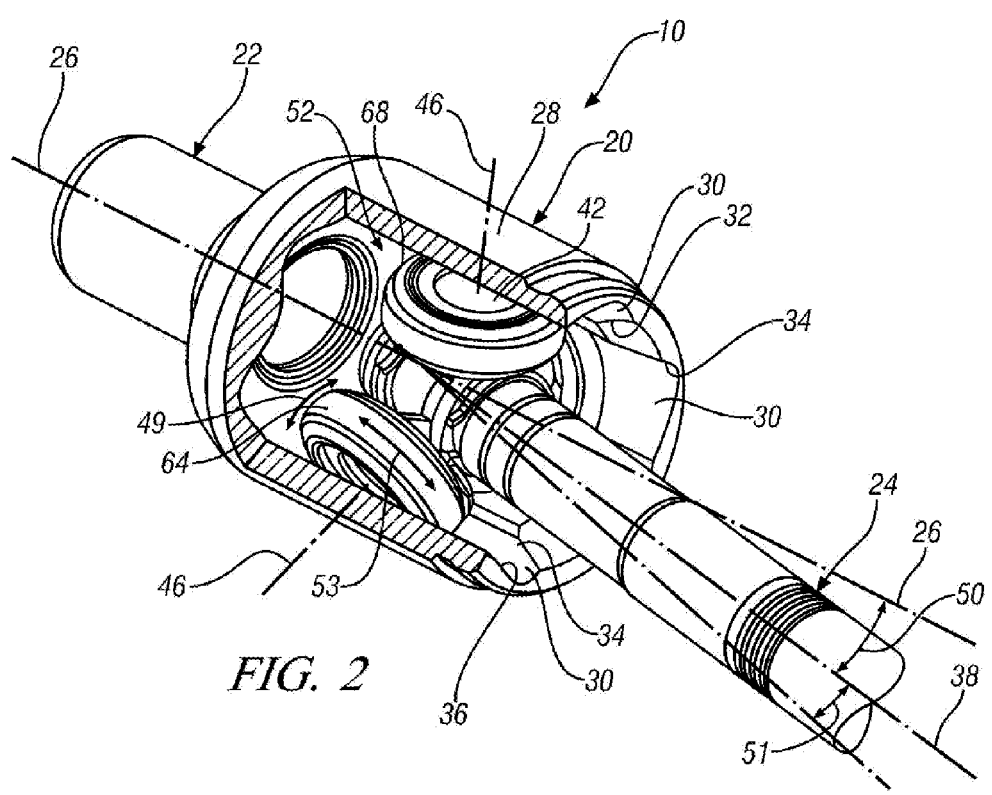
FIG. 2 is a perspective view of the constant velocity joint of FIG. 1 in an articulated position.

As shown in FIGS. 1 and 2, the second rotatable shaft member 24 extends along and rotates about a second longitudinal axis 38. The second rotatable shaft member 24 includes a spider 40 disposed at one end of the second rotatable shaft member 24. The spider 40 may include a splined central bore (not shown) for engagement with splines on the end of a splined shaft (not shown) to comprising rotatable shaft member 24. The spider 40 is disposed within and moves relative to the housing 28 of the first rotatable shaft member 22. The spider 40 includes a plurality of trunnions 42 extending radially outwardly from the second longitudinal axis 38. In the exemplary embodiments of FIGS. 1-5, the spider 40 includes three trunnions 42. It should be appreciated that the number of trunnions 42 corresponds with the number of guide channels 30 within the housing 28. As shown, the three trunnions 42 are radially spaced about the second longitudinal axis 38 at 120 degree intervals apart from one another, and are coplanar along a plane (not shown) that is perpendicular to the second longitudinal axis 38 at the spider center 44. Each of the trunnions 42 extends outwardly from the spider center 44 along a trunnion axis 46, and includes a trunnion outer surface 48. The trunnion outer surface 48 has a convex shape that is concentric with the trunnion axis 46. In one embodiment, the convex outer surface 48 has the shape of a truncated toroid, and may be described by a radial arc or radius of curvature that is rotated about a centroid.

As shown in FIG. 1, the first longitudinal axis 26 and the second longitudinal axis 38 coincide or are collinear when the constant velocity joint 20 is at a joint angle of 0 degrees. As shown in FIG. 2, the first longitudinal axis 26 and the second longitudinal axis 38 intersect when the constant velocity joint 20 is articulated or bent at an angle, i.e., when the first rotatable shaft member 22 and the second shaft member 24 are articulated relative to each other. Accordingly, the spider center 44 is disposed along the first longitudinal axis 26 when the constant velocity joint 20 is at a zero joint angle (FIG. 1) and is radially displaced and orbits about the first longitudinal axis 26 when the constant velocity joint 20 is articulated to a non-zero joint angle (FIG. 2).

The constant velocity joint 20 includes a plurality of ball assemblies 52, with one of the ball assemblies 52 rotatably supported on each of the trunnions 42. Accordingly, the constant velocity joint 20 shown includes three ball assemblies 52, with one ball assembly 52 on each of the three trunnions 42. However, it should be appreciated that the number of ball assemblies 52 corresponds with the number of trunnions 42 and the number of guide channels 30. Each of the ball assemblies 52 is disposed within and in moveable engagement with one of the guide channels 30 of the housing 28. The moveable engagement may include both rolling engagement and sliding engagement, and both types of engagement may be experienced as the ball assemblies 52 move within the guide channels 30.

The ball assemblies 52 include an inner ball 54, and outer ball 56, and a plurality of roller elements 58 disposed between the inner ball 54 and the outer ball 56. The roller elements 58, in combination with the inner ball 54 and the outer ball 56, effectively create a needle bearing assembly. Accordingly, the roller elements 58 reduce rolling friction between the inner ball 54 and the outer ball 56.

Figure 3:
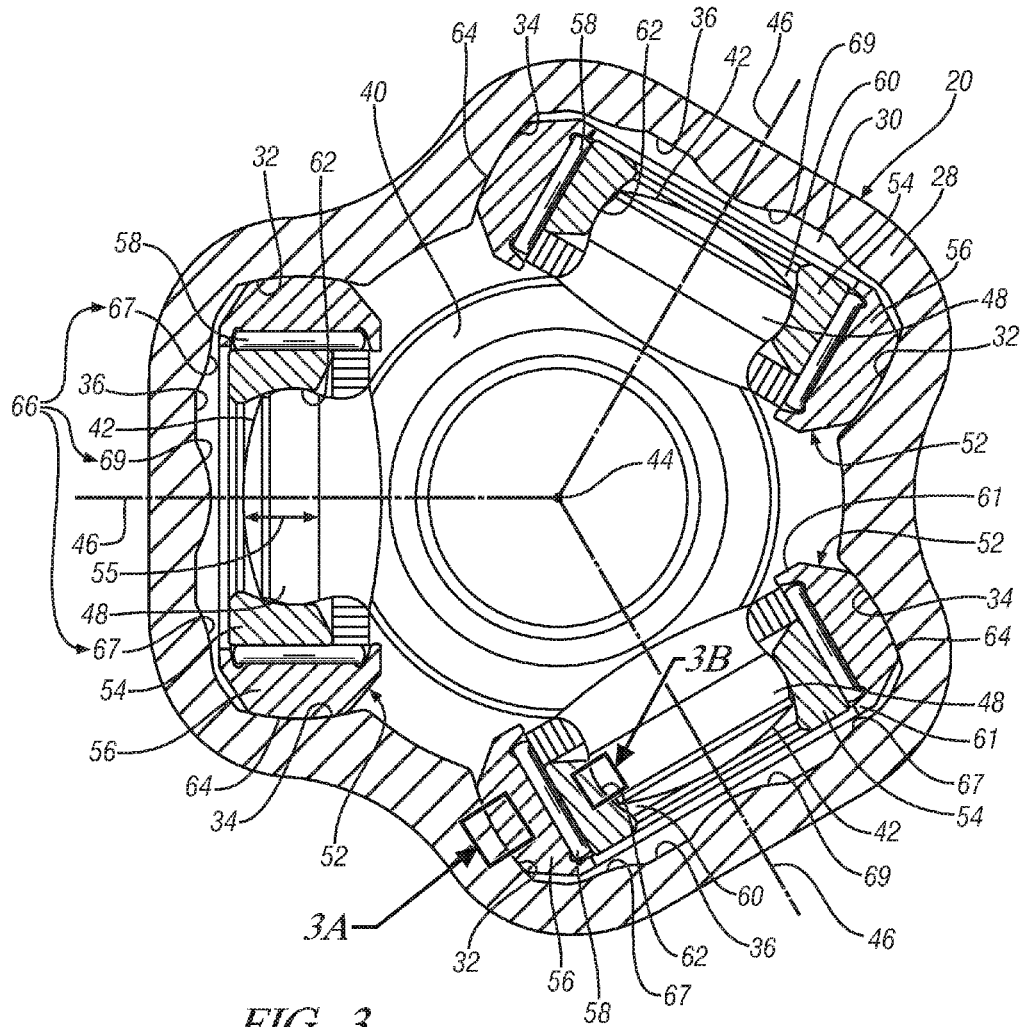
FIG. 3 is a cross-sectional view of the telescoping constant velocity joint of FIG. 1 taken along section 3-3.

The inner ball 54 of the ball assemblies 52 define a central bore 60 having a radially inner surface 62 disposed against and abutting the convex outer surface of the trunnions 42. The radially inner surface 62 of the ball assemblies 52 includes a concave shape concentric with the trunnion axis 46, and may include a truncated toroid, truncated ellipsoid, truncated spheroid or a surface generated by a combination of at least one arc and at least one line revolved about the an axis of the inner ball, which is concentric with the trunnion axis 46. If the radially inner surfaces 62 of the inner balls 54 include the truncated ellipsoid shape, then the curvature of the truncated ellipsoid shape is less than the curvature of the convex trunnion outer surface 48 by an amount sufficient to ensure that the convex outer surface 48 of trunnion 42 nests within concave inner surface 62 of inner ball 54 and permits the inner ball 54 to roll on the trunnion 42 (FIG. 3). In certain embodiments, for example the embodiments of FIG. 3B, the curvature of inner surface 62 is less than the convex outer surface 48 and there is a single point of contact between the trunnions 42 and the inner balls 54. This configuration advantageously reduces rolling friction or sliding friction, or both between trunnions 42 and the inner balls 54. Alternatively, it should be appreciated that the geometric shape of the radially inner surface 62 of the inner ball 54 and the trunnion outer surface 48 may differ from that shown and described herein to achieve a two point contact or a three point contact between the trunnions 42 and the inner ball 54 as is known in the art.

In an exemplary embodiment, where first side surface 32 and second side surface 34 have an elliptical shape as described herein, outer surface 64 of the outer balls 56 may have a convex shape that includes a truncated toroid shape. Further, the curvature of the ellipsoid comprising outer surface 64 may have a curvature that is greater than the curvature of the elliptical arc comprising concave first side surface 32 and second side surface 34.

Figure 3A:
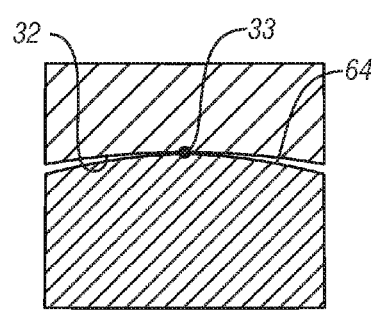
FIG. 3A is an alternate embodiment of region A of FIG. 3 illustrating an alternate curvature of the outer surface of the outer ball that is greater than a curvature of the side surface of the guide channel and meeting in a single point of contact.
Figure 3B:
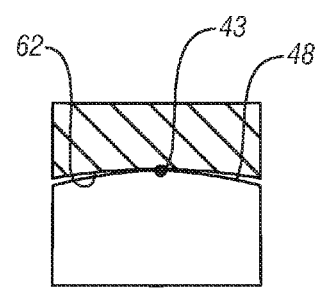
FIG. 3B is an alternate embodiment of region B of FIG. 3 illustrating an alternate curvature of the outer surface of the trunnion that is greater than a curvature of the inner surface of the inner ball and meeting in a single point of contact.

The outer balls 56 of the ball assemblies 52 include radially outer surfaces 64 disposed within the concave first side surfaces 32 and the concave second side surfaces 34. In an exemplary embodiment, ball assemblies 52 and guide channels 30 may be sized such that radially outer surfaces 64 are disposed against and abutting the concave first side surfaces 32 and the concave second side surfaces 34 as illustrated, for example, in FIG. 3. The radially outer surfaces 64 include convex shapes having curvatures that are greater than the curvatures of concave first side surfaces 32 and second side surfaces 34, thereby providing a single point of contact between the radially outer surfaces 64 of the outer balls 56 and the first side surfaces 32 and the second side surfaces 34 as are illustrated in FIG. 3A. Alternatively, it should be appreciated that the geometric shape of the radially outer surfaces 64 of the outer balls 56 and the first and second side surfaces 32, 34 may differ from that shown and described herein to achieve a two point contact or a three point contact between the radially outer surfaces 64 and the first and second side surfaces 32, 34 as is known in the art. As shown in FIGS. 3 and 4, for example, the outer ball 56 of each ball assembly 52 comprises two thrust shoulders 61 projecting radially inwardly from the cylindrical inner surface 63 of the outer ball 56, the plurality of needle bearings 58 being disposed axially between the two thrust shoulders 61 with respect to an axis 46 of the ball assembly 52.

As the first rotatable shaft member 22 and the second rotatable shaft member 24 articulate and/or telescope relative to one another, the outer balls 56 of the ball assemblies 52 roll or glide/slide along the guide channels 30 of the housing 28. Additionally, as the outer balls 56 of the ball assemblies 52 roll or otherwise move axially along the guide channels 30 of the housing 28, the outer balls 56 tilt 49 and rotate 53, FIG. 2, about the trunnions 42. The ball assemblies 52 and outer balls 56 are also free to slide 55 on the trunnions 42 axially along the trunnion axis 46, away from and inwardly toward the spider center 44, as the first rotatable shaft member 22 and the second rotatable shaft member 24 articulate and/or telescope relative to each other. The inner balls 54 may remain generally rotationally stable, i.e., non-rotational, about the trunnions 42. More specifically, the inner balls 54 of the ball assemblies 52 may slide on the trunnions 42 along the trunnion axes 46.

The inner balls 54 and outer balls 56 are preferably solid, integral structures, i.e., they are unitary structures disposed between the trunnions 42 and the housing 28 of the first rotatable shaft member 22. In an exemplary embodiment, the inner balls 54 and outer balls 56 are manufactured from a metal. More particularly, they may be formed from steel, such as by being machined from steel. However, it should be appreciated that the inner balls 54 and outer balls 56 may be formed from other materials, including other metals.

The back surface 36 of each guide channel 30 includes a guide wall 66. The guide wall 66 may include one or both of an outer guide wall 67 or a center guide wall 69. The guide wall 66 extends lengthwise along the back wall 36 of the guide channel 30, along the first longitudinal axis 26. Each of the ball assemblies 52 include a radial outer wall 68, with the radial outer wall 68 disposed adjacent to the guide wall 66 to minimize binding of the ball assembly 52 within the guide channel 30. The guide wall 66 minimizes the potential for the ball assembly 52 to pivot or wobble about the trunnion axis 46, thereby minimizing the possibility of the ball assembly 52 binding within the guide channel 30.

Figure 4A:
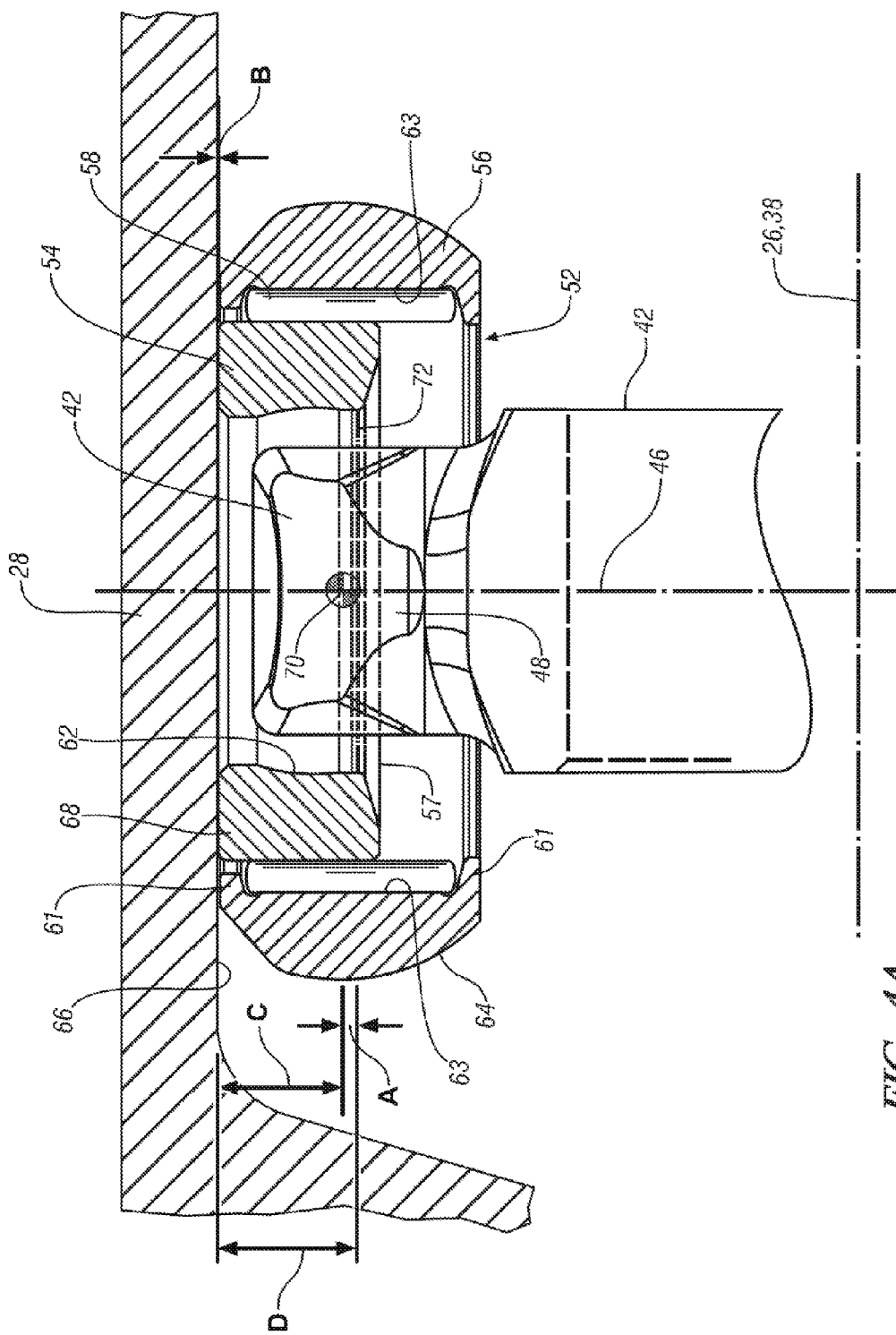
FIGS. 4A and 4B are partial cross-sectional views of the telescoping constant velocity joint of FIG. 1 taken along section 4-4 in an attached condition (FIG. 4A) and in a detached condition (FIG. 4B) caused by over articulation of the joint.
Figure 4B:
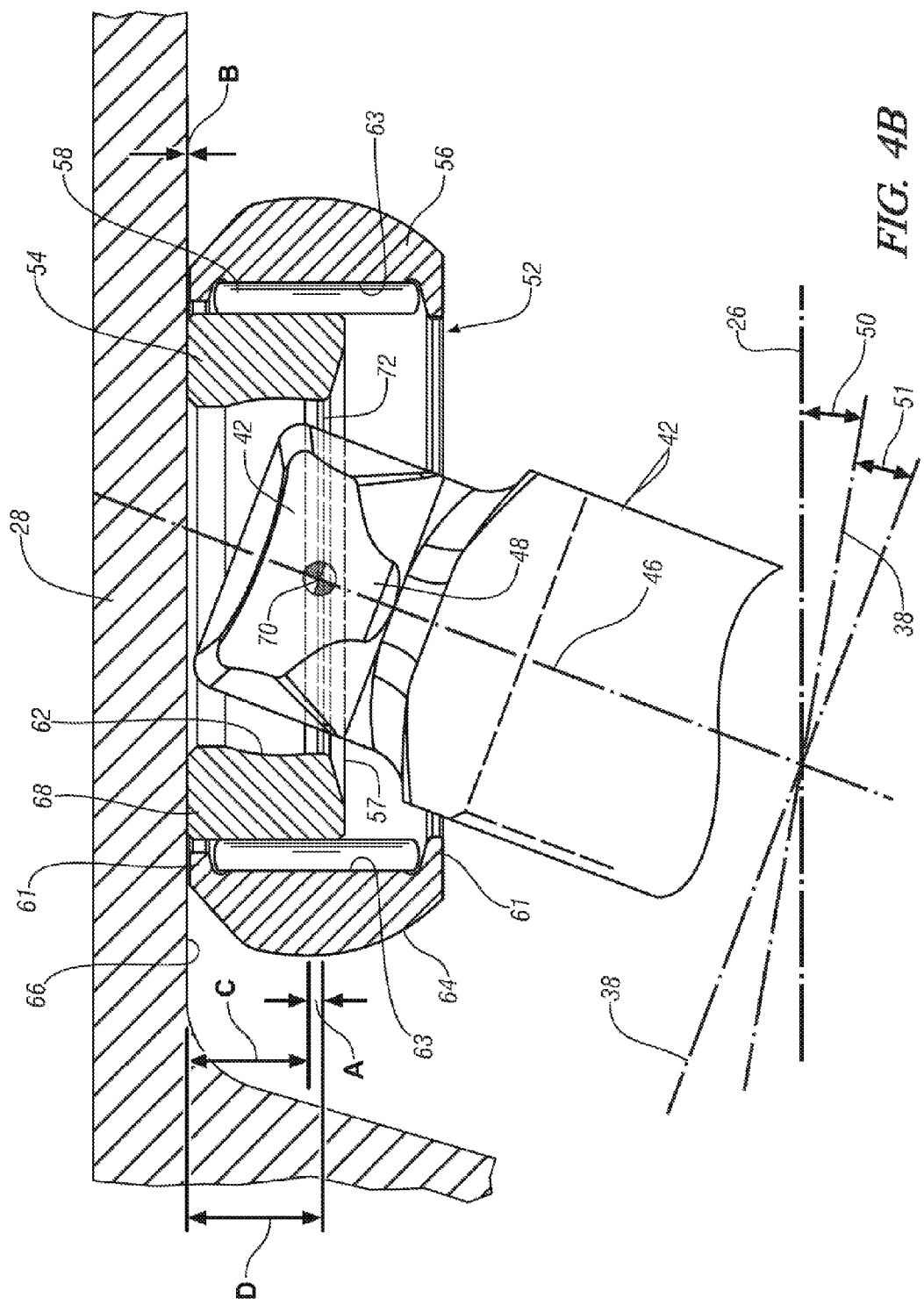
Figure 5:
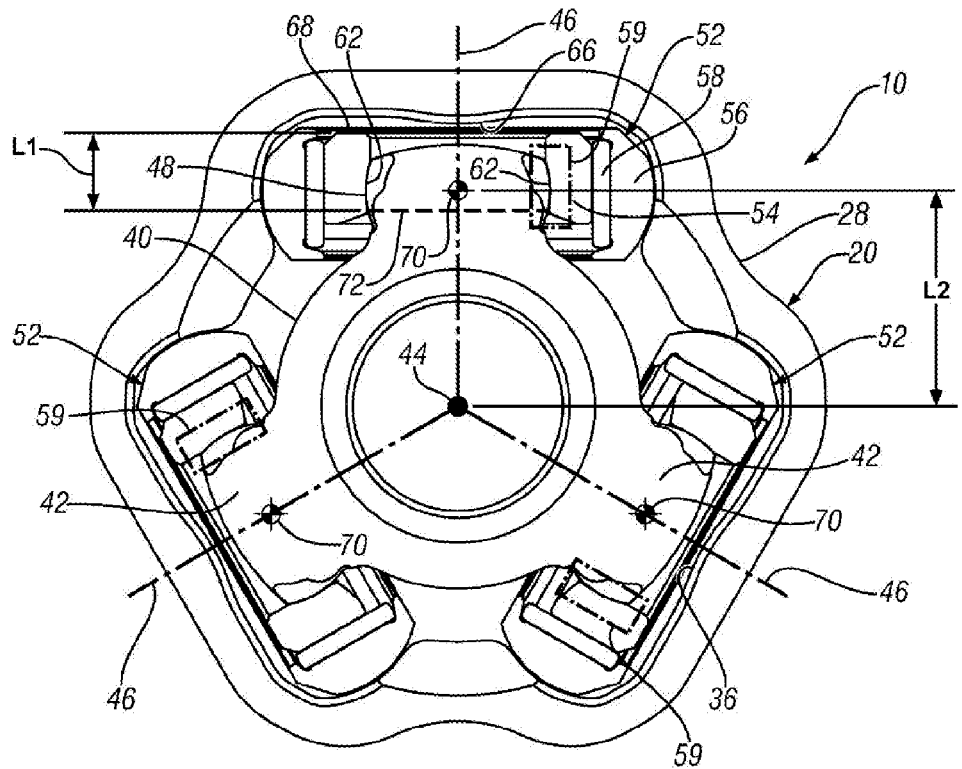
FIG. 5 is a cross-sectional view of an exemplary embodiment of a telescoping constant velocity joint as disclosed herein illustrating the nominal condition of the joint within a predetermined range of angular articulation.
Figure 7:
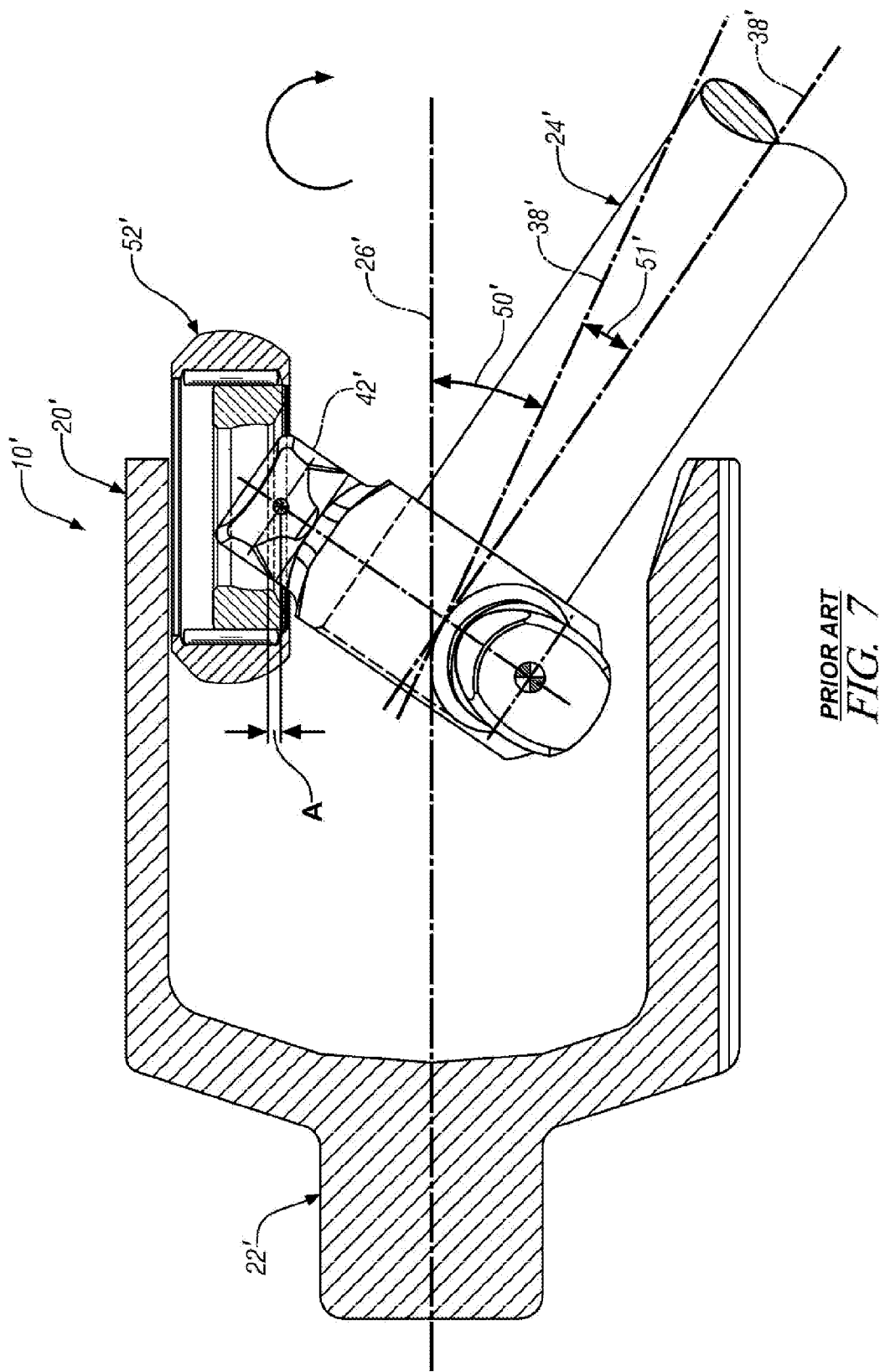
FIG. 7 is a partial sectional view of a related art tripot universal joint in an over articulated condition.
Figure 8:
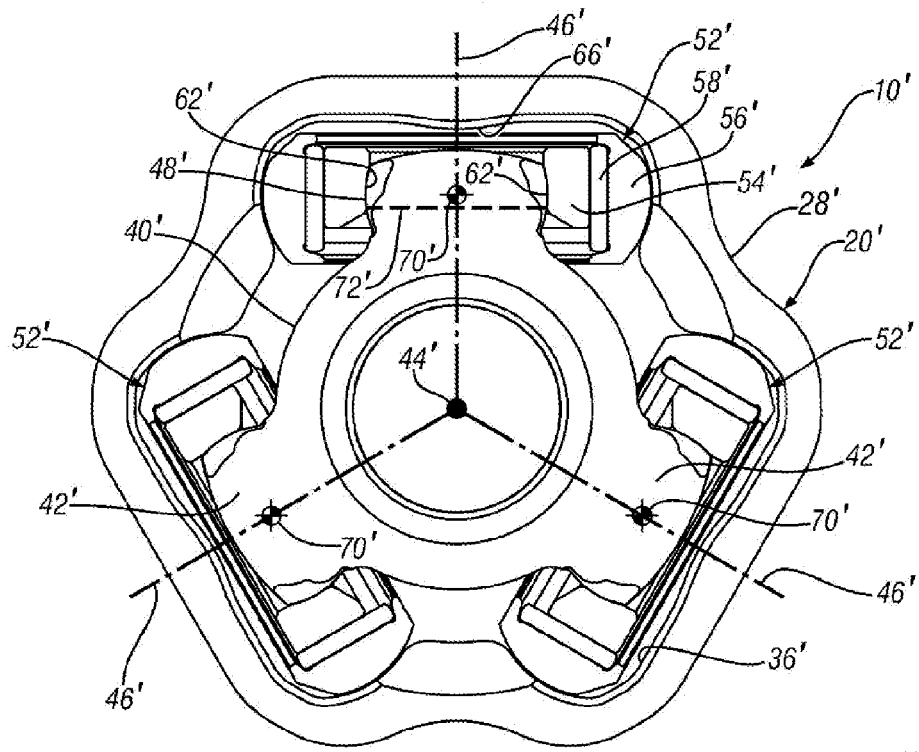
FIG. 8 is a cross-sectional view of a related art tripot universal joint in a predetermined or nominal joint condition.
Figure 9:
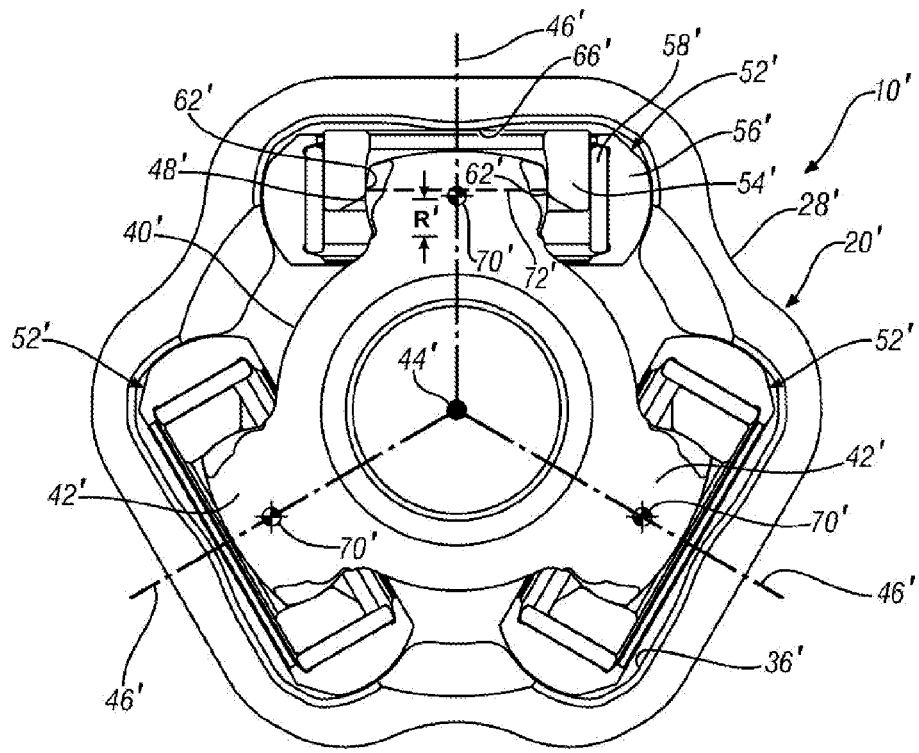
FIG. 9 is a cross-sectional view of a related art tripot universal joint with no articulation after the joint has been articulated to an over-articulation condition and then returned to a predetermined angular range of articulation, wherein the joint does not return to a nominal condition as disclosed herein.

Telescoping constant velocity joint 20 has a predetermined angular range of articulation, illustrated as angular range 50 in FIG. 2, where the joint maintains a predetermined or nominal joint condition where the inner ball 54 is rotatable about the centroid 70 of the trunnion 42 with the inlet diameter 72 disposed axially inwardly of the centroid 70 with reference to the spider center 44, i.e., closer to the spider center 44, as shown in FIGS. 4A and 5. If the first shaft member 22 and the second shaft member 24 are articulated relative to one another to a greater joint angle beyond this range of articulation in an angular range of over-articulation, illustrated as angular range 51 in FIG. 2, then at least one of the ball assemblies 52 may separate from the trunnion 42 as shown in FIG. 4B, in a manner similar to that illustrated in FIG. 7 for related art joints. However, in contrast with related art universal joints, as illustrated in FIGS. 7-9, the universal joint 10 of the present invention has a detachably reattachable coupling 59 of the inner surface 62 of the inner ball 54 to the outer surface 48 of the trunnion 42. By detachably reattachable, it is meant that although an over-articulation condition may result in the inner ball 54 becoming detached from the trunnion 42, such that the inner surface 62 of the inner ball 54 is no longer in contact with or rotatable about the outer surface 48 of the trunnion, the inner ball 54 is reattachable and may be reattached to the trunnion 42 upon restoration of a predetermined angular range of articulation 50 of joint 20 and first shaft member 22 relative to second shaft member 24. Therefore, once the ball assembly 52 is separated from the trunnion 42, the ball assembly 52 will reattach itself to the trunnion 42 when the joint is returned within the predetermined angular range of articulation 50 and thus the detachment is reversible and the joint is capable of returning to the nominal condition (FIG. 5) where the trunnion 42 and convex outer surface 48 are disposed inside the inlet diameter 72 and along inner surface 62 of inner ball 54 as it rotates. The centroid 70 of the trunnion 42 will be disposed inside of the inlet diameter 72 and inner surface 62 of inner ball 54 will rotate on the entire bearing portion of inner surface 62. This restoration of the detachably reattachable coupling 59 and reattachment of inner ball 54 on trunnion 42 will occur automatically when constant velocity joint 20 returns from an over-articulated condition to a predetermine angular range of articulation. This is a significant advantage over related art universal joints in that once the universal joint 20 has experienced an over-articulated condition, it is no longer necessary to disassemble the joint to reattach the detached ball assembly 52, particularly the inner surface 62 of the detached inner ball 54 onto the convex outer surface 48 of trunnion 42. Thus, it is no longer necessary to remove the spider 40 from within housing 28 to reattach the ball assembly 52 onto the trunnion 42, and thus it is no longer necessary to remove the joint from its application, such as the drivetrain of a vehicle to restore the predetermined or nominal joint condition.

Figure 6:
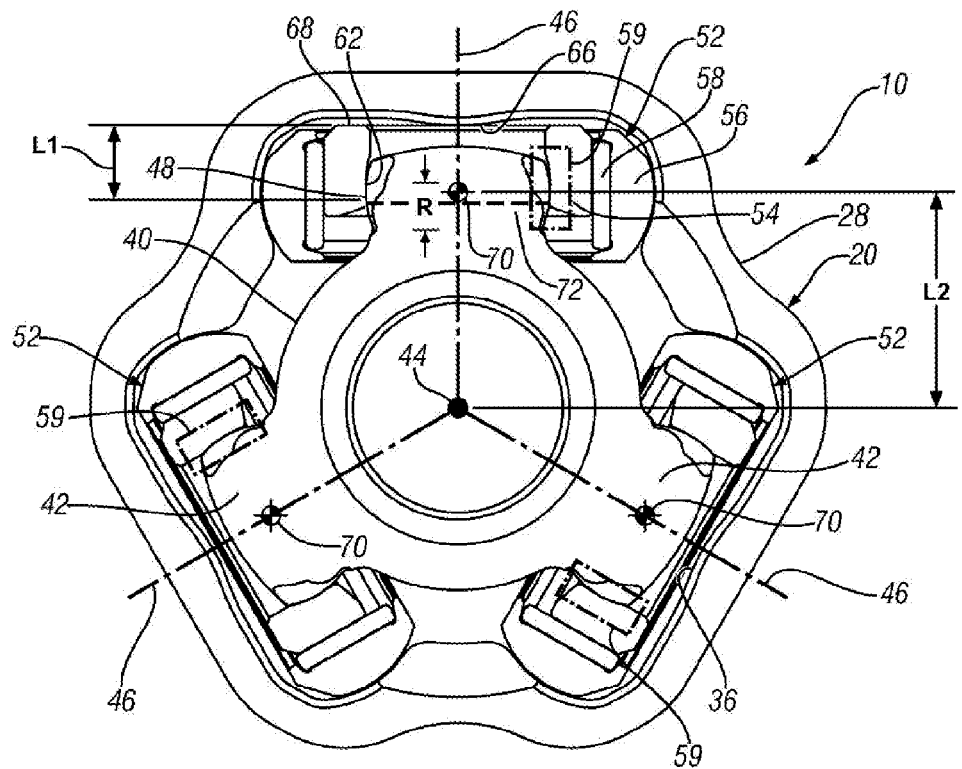
FIG. 6 is a cross-sectional view of the exemplary embodiment of FIG. 4 after the joint has been articulated to an over-articulated condition and then returned to a predetermined angular range of articulation and a nominal condition of the joint as disclosed herein.

The detachably reattachable coupling 59 of each inner ball 54 and associated ball assembly 52 to the respective trunnion 42 is provided by fixing a location of an inlet diameter 72 of the inner ball 54 in relation to a predetermined range of motion (R) of a centroid 70 of the respective trunnion 42. The predetermined range of motion (R) of centroid 70 is with reference to motion from the detached condition of inner ball 54 to the attached condition (FIG. 6). The detachably reattachable coupling 59 is configured to detach the inner ball 54 from the trunnion 42 in an over-angulation condition 51 of the joint 20. The inner ball 54 has an axial length ($L_1$) between the outer wall 68 and the inlet diameter 72 and the respective trunnion has an axial length ($L_2$) between the spider center 44 and the centroid 70 of the trunnion 42, and the axial length ($L_1$) of the of the inner ball and the axial length ($L_2$) of the trunnion are selected, together with other elements of the joint 20 that effect the relative positions of the inlet diameter 72 and the centroid 70 of the trunnion 42, including the predetermined range of motion (R) of the centroid 70 of the trunnion 42, to enable the outer wall 68 of a detached inner ball 54 to be pressed against a guide wall 66 and provide the predetermined range of motion (R) of the centroid 70 of the trunnion 42 to pass through the inlet diameter 72 of the inner ball 54 and reattach the inner ball 54 to the trunnion 42, thereby restoring the detachably reattachable coupling 59 when the joint is returned from the over-angulation condition to a predetermined angulation condition. This is in contrast to related art CV joints which have a range of motion (R') relative to the inlet diameter 72' which do not provide detachably reattachable coupling of the inner ball 54' and trunnion 42'.

Referring to FIG. 4, "A" is the distance between a centroid 70 of the trunnion 42 and an inlet diameter 72 of the inner ball 54; "B" is the distance between an outer wall 68 of the inner ball 54 and the guide wall 66 of the guide channel 30; "C" is the distance between the centroid 70 of the trunnion 42 and the guide wall 66 of the guide channel 30; and "D" is the distance between the inlet diameter 72 and the outer wall of the inner ball 54. In an exemplary embodiment, the centroid 70 of the trunnion 42 may further be described as the design center of the trunnion 42, which is disposed on the trunnion axis 46 along a plane passing perpendicular to the trunnion axis 46 through the center of the trunnion 42 measured along the trunnion axis 46. In another exemplary embodiment, an imaginary plane (not shown) perpendicular to the trunnion axis 46 passing through the centroid 70 may include a maximum diameter of the trunnion. In an exemplary embodiment, the inlet diameter 72 of the inner ball 54 may be further described as the diameter of the circumferential edge of the central bore 60 of the inner ball 54 on a face of the inner ball 54 disposed nearest the spider center 44 of the spider 40, and defines the opening through which the trunnion 42 is inserted into the inner ball 54. In another exemplary embodiment, the inlet diameter 72 is located proximate an inner face 57 of inner ball 54 and represents the minimum diameter of the central bore 60. In an exemplary embodiment, the inlet diameter 72 is less than the maximum diameter of the trunnion 42 such that an interference exists and a predetermined insertion force is required to press an inner ball 54 onto its respective trunnion 42. Likewise, during an over-articulation condition, inner ball 54 may be detached if the trunnion 42 experiences a predetermined detachment force that is sufficient to overcome the predetermined insertion force, which in an exemplary embodiment is greater than the predetermined insertion force. Similarly, the detachably reattachable coupling 59 may be restored when the trunnion 42 is pressed into the inlet diameter 72 with a force that is greater than the predetermined insertion force as the joint is returned from an over-angulation condition to a predetermined angulation condition.

The subject invention includes forming the inner ball 54 of the ball assemblies 52 to include the dimension "D" being greater than the dimension "C". Accordingly, when the inner ball 54 is disposed against the guide wall 66, i.e., the dimension "B" is equal to zero and the dimension "A" remains greater than zero. Accordingly, the subject invention provides that the centroid 70 of the trunnion 42 has a predetermined range of motion (R) so that from a detached condition of inner ball 54, the centroid 70 is able to pass through the inlet diameter 72 of inner ball 54 to be recoupled to outer surface 48 of trunnion 42 so that centroid 70 is closer to the guide wall 66 than the inlet diameter 72 of the inner ball 54. This ensures that the ball assemblies 52 are capable of sliding back onto the trunnions 42 as the shaft members 22, 24 return to being within the predetermined range of articulation 50 in the event the constant velocity joint 20 is over-articulated beyond the range of articulation 50 and the inner ball 54 of the ball assembly 52 detaches from the trunnion 42.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A tripot universal joint, comprising:
a first rotatable shaft member having a first longitudinal axis and a housing, the housing having three longitudinal guide channels disposed parallel to the first longitudinal axis and equally spaced circumferentially from one another, each one of the three longitudinal guide channels defined by two opposing concave side surfaces and a back surface, the back surface of each guide channel facing radially inwardly with respect to the first longitudinal axis, the opposing concave side surfaces of each guide channel disposed parallel to one another and separated circumferentially with respect to the outer drive member by the back surface of that guide channel;
a rotatable second shaft member having a second longitudinal axis and comprising a spider having three radially extending trunnions equally spaced circumferentially from one another and on respective coplanar radial axes which intersect the second longitudinal axis at a spider center, each of the trunnions having a convex outer surface disposed within an associated longitudinal guide channel and facing the opposing concave side surfaces thereof; and
three rotatable ball assemblies, each rotatably disposed on the convex outer surface of a respective trunnion and configured to tilt and rotate about the trunnion and to slide along the radial axis of the trunnion, each ball assembly having an outer ball, the outer ball having a convex outer surface that is configured for disposition within the concave side surfaces of the longitudinal guide channel with which it is associated for moveable engagement within the channel, and an inner ball that is rotatably disposed within the outer ball with a concave inner surface that is rotatably disposed on the convex surface of the trunnion with a detachably reattachable coupling, wherein in an over articulation condition of the joint the convex surface of one of the trunnions is configured to detach from the concave inner surface of the inner ball, and wherein upon return to a predetermined angulation condition where the joint is articulated within a predetermined angular range of articulation, the trunnion that was detached from the concave inner surface of the inner ball is reattached to and once again rotatably disposed on the convex surface of the trunnion.

2. The universal joint of claim 1, wherein the detachably reattachable coupling is provided by fixing a location of an inlet diameter of the inner ball in relation to a predetermined range of motion of a centroid of the respective trunnion, and wherein upon return from the over articulation condition of the joint to the predetermined angulation condition, the location of the inlet diameter of the inner ball is within the predetermined range of motion of the centroid of the trunnion, thereby allowing the centroid of the trunnion to pass through the inlet diameter of the inner ball.

3. The universal joint of claim 2, wherein the detachably reattachable coupling is configured to detach the inner ball from the trunnion in the over-angulation condition of the joint, and wherein the inner ball has an axial length between an outer wall and the inlet diameter and the respective trunnion has an axial length between a spider center and a centroid of the trunnion, and the axial length of the of the inner ball and the axial length of the trunnion are selected to enable the outer wall of a detached inner ball to be pressed against a guide wall and provide the predetermined range of motion that allows the centroid of the trunnion to pass through the inlet diameter of the inner ball, reattach the inner ball to the trunnion and thereby restore the detachably reattachable coupling when the joint is returned from the over-angulation condition to the predetermined angulation condition.

4. The universal joint of claim 3, wherein the joint is configured to transition from the over-angulation condition to the predetermined angulation condition and to restore the detachably reattachable coupling by reattachment of the detached inner ball and respective trunnion where there is a distance (B) between an outer wall of the inner ball and a guide wall of the guide channel, a distance (C) between the centroid of the trunnion and the guide wall and a distance (D) between an axial location of the inlet diameter of the inner ball and an outer wall of the inner ball and D>C when B=0.

5. The universal joint of claim 4, wherein the inlet diameters of the inner balls are less than the maximum diameters of the respective trunnions.

6. The universal joint of claim 1, wherein the moveable engagement of the outer balls within the channels comprises rotatable or slidable engagement.

7. The universal joint of claim 1, wherein the concave side surfaces have side surface curvatures and the outer surfaces of the respective outer balls have outer surface curvatures, and the side surface curvatures are less than the outer surface curvatures.

8. The universal joint of claim 7, wherein the outer surface curvatures and the side surface curvatures establish a single point of contact between the outer balls and respective side surfaces.

9. The universal joint of claim 1, wherein the outer surfaces of the outer balls comprise truncated toroids.

10. The universal joint of claim 1, wherein the inner surfaces of the inner balls have inner surface curvatures and the outer surfaces of the respective trunnions have outer surface curvatures, and the inner surface curvatures are less than the outer surface curvatures.

11. The universal joint of claim 10, wherein the inner surface curvatures of the inner balls and the outer surface curvatures of the respective trunnions establish a single point of contact between the inner balls and trunnions.

12. The universal joint of claim 1, wherein the inner surfaces of the inner balls have concave shapes that are configured for engagement with the convex outer surfaces of the associated trunnions.

13. The universal joint of claim 12, wherein the concave shapes of the inner surfaces of the inner balls comprise truncated toroids, truncated ellipsoids, truncated sphereoids or surfaces generated by combinations of arcs and lines revolved about the an axis of the inner ball.

14. The universal joint of claim 1, wherein the outer surfaces of the trunnions comprise truncated toroids.

15. The universal joint of claim 1, wherein the guide channels each have an outer guide wall or a center guide wall, or a combination thereof.

16. The universal joint of claim 1, wherein the guide channels each have an outer guide wall.

17. The universal joint of claim 1, wherein the guide channels each have a center guide wall.

18. The universal joint of claim 1, wherein each ball assembly has a bearing train disposed radially between the inner ball and the outer ball.

19. The universal joint of claim 18, wherein the bearing train of each ball assembly comprises a plurality of needle bearings disposed between a cylindrical inner surface of the outer ball and a cylindrical outer surface of the inner ball.

20. The universal joint of claim 19, wherein the outer ball of each ball assembly has two thrust shoulders projecting radially inwardly from the cylindrical inner surface of the outer ball, the plurality of needle bearings being disposed axially between the two thrust shoulders with respect to an axis of the ball assembly.

* * * * *